United States Patent [19]
Clark et al.

[11] Patent Number: 5,818,628
[45] Date of Patent: Oct. 6, 1998

[54] ULTRASHORT OPTICAL PULSE AMPLIFIERS INCORPORATING A GAIN MEDIUM PREFERENTIALLY COOLED ALONG A CRYSTALLINE AXIS

[75] Inventors: William G. Clark, Pittsford, N.Y.; Yang Pang, Ann Arbor, Mich.

[73] Assignee: Clark-MXR, Inc., Dexter, Mich.

[21] Appl. No.: 771,227

[22] Filed: Dec. 20, 1996

[51] Int. Cl.⁶ .................................. H01S 3/00; H01S 3/04
[52] U.S. Cl. .............................. 359/337; 359/333; 372/36
[58] Field of Search ..................................... 359/337, 342, 359/333; 372/36

[56] References Cited

U.S. PATENT DOCUMENTS

| | | | |
|---|---|---|---|
| 3,487,332 | 12/1969 | Cordy, Jr. | 372/34 |
| 4,429,394 | 1/1984 | Guch, Jr. | 372/34 |
| 4,949,346 | 8/1990 | Kuper et al. | 372/38 |
| 5,572,358 | 11/1996 | Gabl et al. | 359/347 |

*Primary Examiner*—Mark Hellner
*Attorney, Agent, or Firm*—Cumpston & Shaw

[57] ABSTRACT

An ultrashort optical pulse amplifier that incorporates a gain medium preferentially cooled along a crystalline axis for partially ameliorating the thermally induced distortions and losses created by cylindrically symmetric cooled designs. The ultrashort pulse amplifier can be pumped with higher pump powers without degradation of the output spatial mode structure and the overall efficiency of extraction of energy from the gain medium is improved. The gain medium preferably has a rectangular cross section and cooling means are provided in thermal contact with only selected opposing surfaces of the gain medium so that thermal gradients lie approximately along a crystalline axis to reduce thermally-induced birefringence.

50 Claims, 3 Drawing Sheets

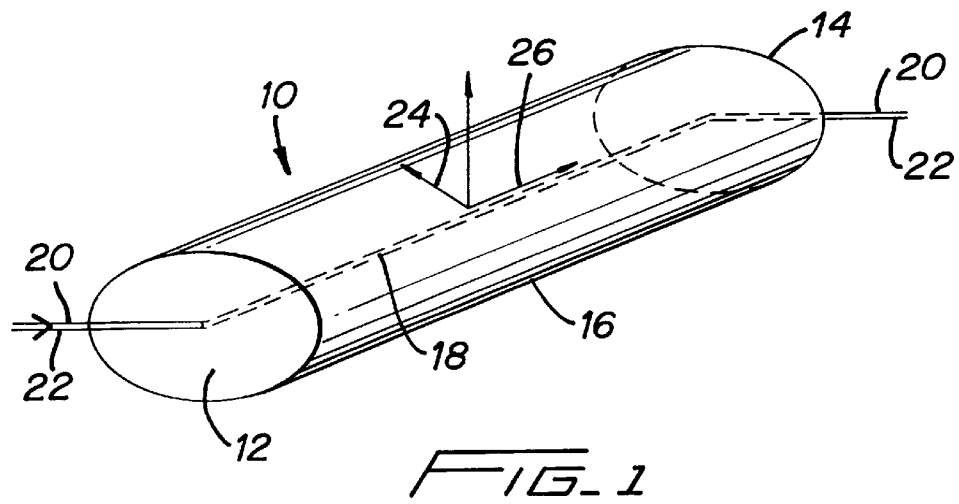
FIG_1
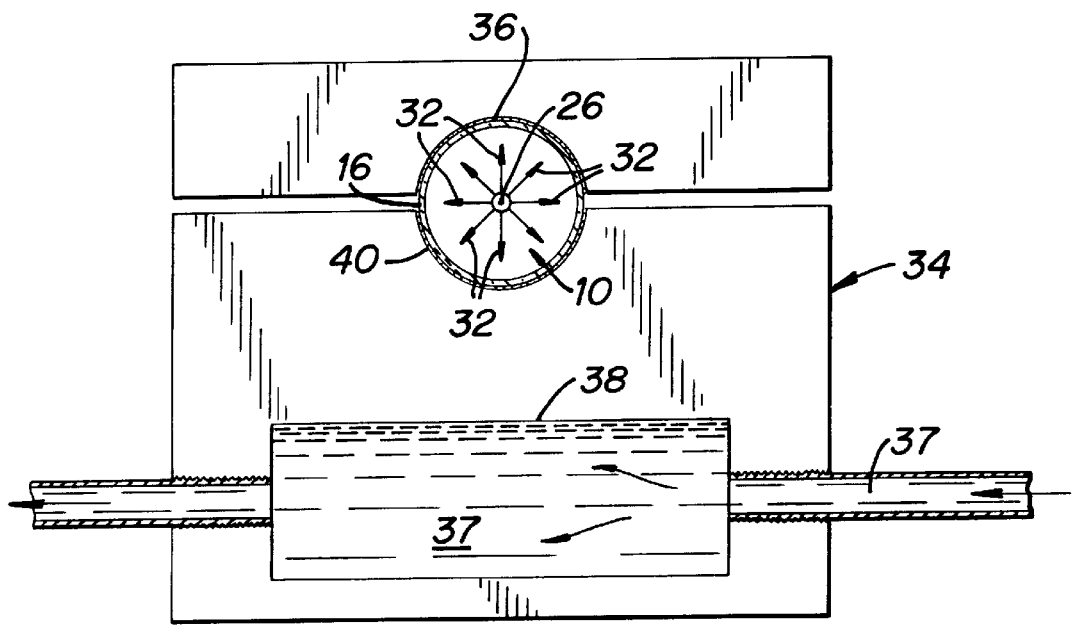
FIG_2

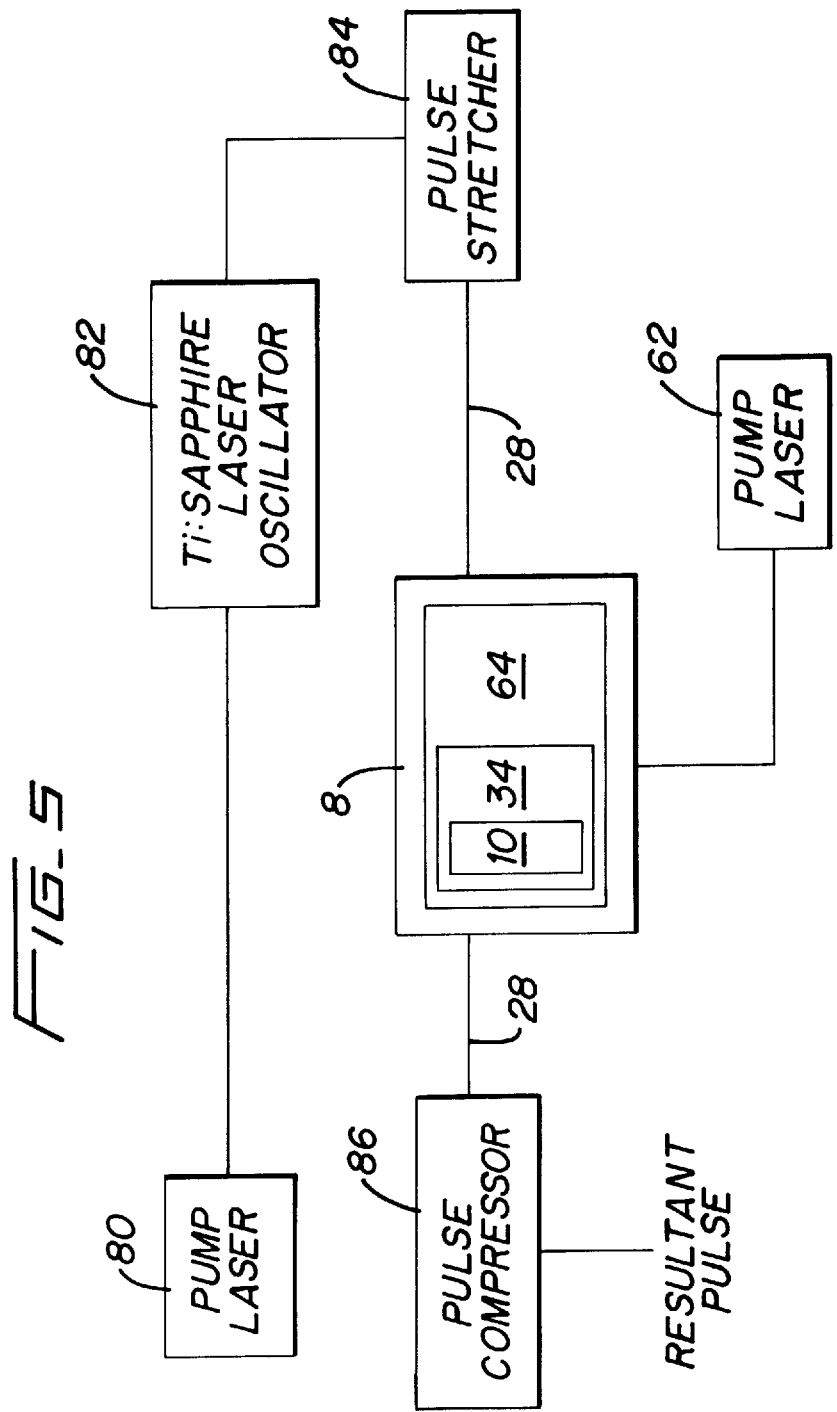

ULTRASHORT OPTICAL PULSE AMPLIFIERS INCORPORATING A GAIN MEDIUM PREFERENTIALLY COOLED ALONG A CRYSTALLINE AXIS

FIELD OF THE INVENTION

The present invention relates to optical amplifier systems which amplify ultrashort input pulses and provide amplified ultrashort output pulses, and more specifically to amplifiers that incorporate a gain medium in which conductive cooling occurs substantially along a crystalline axis.

BACKGROUND OF THE INVENTION

Amplifiers that amplify ultrashort pulses (that is, pulses of duration substantially less than 1 ns) which have heretofore been proposed incorporate a gain medium whose shape is that of a rod that is conductively cooled by placing substantially all of the cylindrical wall in contact with a heat sink. This design configuration places the most surface cooling area closest to the heat load at the center of the rod and is thus considered desirable because it conceptually minimizes the adverse effects on amplifier performance caused by heating of the gain medium (decreased gain, spatial mode structure changes due to thermally-induced lensing effects, increased losses due to thermally-induced birefringence, etc.). A cylindrically cooled gain medium is also the least expensive geometry in which a solid gain media can be obtained. This is a natural consequence of the fact that these rods are commonly cut from a boule by coring. Thus, to obtain a 5 mm cross sectional diameter gain rod of Ti:Sapphire it is only necessary to core the boule with a 5 mm ID cutting tool. To obtain other shapes, for example a square cross sectional profile of 5 mm×5 mm, it is necessary to first core the boule using an approximate 7.07 mm ID cutting tool to obtain an at least 7.07 mm diameter rod, and then cut off the excess material to shape it into a 5 mm×5 mm square cross section. These additional steps add cost to the fabrication process and are considered to be unnecessary especially given the perceived advantage of cooling a cylindrically shaped gain medium by heat conduction radially outward from the center axis to the cylindrical wall.

To understand and appreciate the significance of this invention it is worthwhile taking a few moments to understand the standard configuration used to cool the gain rod employed in amplifying ultrashort pulses.

Referring first to FIG. 1 there is shown a cylindrically-shaped gain medium 10 with Brewster angle end faces 12 and 14 of the type typically used in amplifying ultrashort pulses. The use of a flat, Brewster angle or any other end face geometry is not essential to this invention which is intended to include all such variations on the design. For the purpose of this discussion, the gain medium 10 is preferably a Ti:Sapphire crystal. However, those skilled in the art will immediately recognize how other gain media can be adapted to this invention. The cylindrical gain medium or crystal 10 shown in FIG. 1 has a cylindrical wall 16 and a center axis 18 along which a pump light beam 20 and a laser seed pulse 22 to be amplified are arranged to propagate approximately colinearly through the center of the gain medium 10 without reflection off any surface. Under most normal conditions, for example, when the gain medium 10 is a Ti:Sapphire crystal, the pump light beam 20 and laser seed pulse 22 are arranged to be linearly polarized along a c-axis 24 of the Ti:Sapphire gain medium 10.

In FIG. 2, there is shown a cross section of the cylindrically-shaped gain medium 10 mounted within a cavity 40 in a heat sink 34. The optical axis 26 of the gain medium 10 in FIG. 1 which defines the center axis 18 of the gain medium 10 lies along the normal to the plane of the page. The heat load created by the absorption of the pump beam 20 along the center axis 18 and the optical axis 26 of the gain medium 10 is conducted radially outward along the direction of the dotted arrows 32 radiating outward from the center axis 18 to the cylindrical wall 16. Substantially all of the cylindrical wall 16 of the gain medium or crystal 10 is arranged to be in thermal contact with a heat sink 34 by using a thermally conducting paste or Indium foil 36 between the surfaces of the gain medium 10 and the heat sink 34. Excess heat is carried away by the flow of water 37 through a cooling chamber 38 in the heat sink 34.

Ultrashort pulse amplifiers that use this cylindrically-shaped, and cylindrically-cooled gain media geometry run well up to a certain level of input pump power. The level of input power is determined by factors such as the efficiency of the thermal contact between the gain media and the cooling block, the diameter of the gain media, the dopant level, etc. Beyond a certain average pump power, however, system performance begins to degrade due to thermal loading of the gain medium. Absorption of the pump beam and the approximate radial conduction of heat to the cylindrical wall of the gain medium creates two modes of degradation. First, it creates a thermal lens with spherical aberrations that alters the optical properties of the cavity and gives rise to distortions in the spatial mode of the output of the amplifier. Since many applications for amplified ultrashort seed pulses require that they possess a high quality spatial mode, performance degradation in this manner can have a significant deleterious effect on the utility of a system exhibiting this behavior. Additionally, the approximately radial thermal conduction pattern of a thermally loaded, radially-cooled gain medium induces a birefringence in the gain medium that couples energy into a non-optimum state of polarization which, when incident on other polarization-sensitive elements in the cavity, results in energy loss and increases the amount of energy in undesirable pre-pulse, post-pulse, and satellite pulses in the output beam.

This invention employs cooling of the gain medium substantially along a crystalline axis in the design of ultrashort pulse amplifiers that, when used in combination with other elements in the resonator cavity, partially ameliorates the thermally induced distortions and losses created by the prior art. The result is an ultrashort pulse amplifier that can be pumped with higher pump powers without degradation of the output spatial mode structure, and improvement in the overall efficiency of extraction of energy from the gain medium. In a preferred embodiment, the gain medium is arranged to have a rectangular cross section in the plane whose normal lies along the optical axis of the gain medium, and possesses Brewster angle end faces for minimizing reflection losses. Cooling means are provided in contact with selected surfaces and not with others so that thermal gradients lie approximately along a crystalline axis to reduce thermally-induced birefringence. The thermal lens created by this gain geometry possesses more of the characteristics of a cylindrically astigmatic lens which are easier to correct by adjustment of the cavity folding angles of the amplifier.

Accordingly it is an object of the present invention to provide improved ultrashort pulse amplifier systems that can produce higher output pulse energies.

It is a further object of the present invention to provide improved ultrashort pulse amplifier systems with higher prepulse, postpulse, and satellite pulse extinction ratios.

It is a still further object of the present invention to provide improved handling of the thermal load created in a gain medium by the pump beam in an ultrashort pulse amplifier.

It is a still further object of the present invention to provide reduced thermally-induced birefringence in a gain medium of regenerative amplifiers.

It is a still further object of the present invention to shape the thermally induced lens effects in a gain medium so that can be more readily compensated by cavity alignment.

It is a still further object of the present invention to control the adverse effects of thermally-induced distortions by cooling the gain medium preferentially along certain geometrical axes and not others.

It is a still further object of the present invention to provide improved ultrashort pulse amplifier systems that produce higher output pulse energies free of spatial mode structure degradation.

It is a still further object of the present invention to provide easier orientation of the crystalline axis along preferred directions.

SUMMARY OF THE INVENTION

Briefly described, the present invention includes an ultrashort pulse amplifier apparatus for amplifying an ultrashort laser seed pulse comprising optical components arranged to direct the ultrashort laser seed pulse through a gain medium; a gain medium that is cooled by thermal conduction to a heat sink wherein the direction of heat flow is substantially along at least one crystalline axis; and a source of energy for excitation of the gain medium.

Further, the present invention discloses a novel method of operating an optical amplifier for amplifying ultrashort pulses comprising the steps of pumping a gain medium capable of amplifying seed pulses whose bandwidth substantially coincides with that of the gain medium; directing a seed pulse through the gain medium; and cooling the gain medium preferentially along a crystalline axis to minimize losses created by thermally-induced birefringence.

BRIEF DESCRIPTION OF THE DRAWINGS

The foregoing and other objects, features and advantages of the invention, as well as presently preferred embodiments thereof, will become more apparent from a reading of the following description in connection with the accompanying drawings in which:

FIG. 1 is a perspective view of a cylindrically shaped gain rod of the prior art;

FIG. 2 is a cross-sectional view of a cylindrically-shaped gain media in a cooling block of the prior art;

FIG. 5 is a schematic diagram illustrating an optical amplifier system in accordance with a preferred embodiment of the invention.

DETAILED DESCRIPTION OF THE INVENTION

The present invention is directed to art in which an ultrashort pulse amplifier utilizes either a resonant cavity, commonly referred to as a regenerative amplifier, a multi-pass design, or single-pass design, or some series combination of each, having one or more gain media of noncylindrical shape and a cooling geometry that minimizes thermally-induced spherical aberrations and birefringence. As is well known in the prior art, gain media are incorporated within amplifiers. This invention addresses an improved design and method for the cooling of gain media within amplifiers. Standard elements well known in the prior art are also provided for creating laser seed pulses which are then injected into the resonant cavity, these elements preferably include in part a modelocked oscillator having a wavelength of emission substantially the same as that at which the gain medium can support amplification of the energy of the injected pulse. Such standard elements are more fully explained in U.S. Pat. No. 5,572,358, naming Gabl et. al, herein incorporated by reference. In a preferred embodiment of this invention, the gain medium is Ti:Sapphire for both the oscillator and amplifier.

Figure 3:
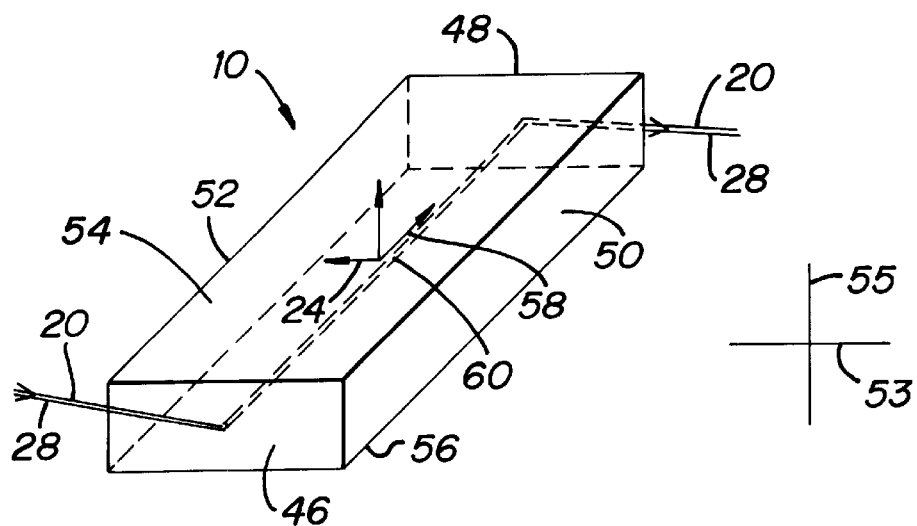
FIG. 3 is a perspective view of a rectangular-shaped gain medium used in traditional ultrashort pulse amplifiers used in the present invention.

The present invention is directed to an optical amplifier 8 for amplifying an least one ultrashort laser seed pulse comprising optical components arranged to direct at least one ultrashort laser seed pulse 28 through a gain medium 10, a gain medium 10 which is cooled by thermal conduction in a heat sink 34 wherein the direction of heat flow is substantially along at least one crystalline axis, and a source of energy 62 for excitation of the gain medium 10. Referring first to FIG. 3, there is shown a rectangular-shaped gain medium 10 with a first end face 46 and a second end face 48, preferably Brewster angle end faces, of the type that might be used in the present invention to amplify ultrashort seed pulses. The use of a rectangular geometry is but one that will suggest itself to those skilled in the art. Preferably, the gain medium 10 is a solid that is doped with an element selected from a group consisting of titanium, chromium, aluminum or a rare-earth element. For purposes of this discussion, the gain medium 10 will preferably be a titanium:sapphire crystal. However, those skilled in the art will immediately see how other gain media can be adapted to this invention. The rectangular shaped gain medium or crystal 10 shown in FIG. 3 has four surfaces, a first surface 50 and a second surfaces 52 with normals that lie along the horizontal plane 53 and a third surface 54 and a fourth surface 56 with normals that lie along the vertical plane 55. A center axis 58 of the gain media 10 is also identified as the optical axis 60 of the titanium:sapphire (Ti:Sapphire) crystal 10 along which a pump light beam 20 and the laser seed pulse 28 to be amplified are arranged to propagate approximately colinearly through the center of the gain medium 10. Under most normal conditions, for example, the pump light beam 20 and seed pulse 28 are arranged to be linearly polarized along a c-axis 24 of the gain medium 10 which is also colinear with the normal to the first and second surfaces 50 and 52 of the gain medium 10.

Referring to FIG. 5, the optical amplifier 8 for amplifying an ultrashort laser seed pulse 28 comprises optical components arranged to direct the ultrashort laser seed pulse 28 through the gain medium 10. The gain medium 10 is cooled by thermal conduction within a heat sink 34 wherein the direction of the heat flow is substantially along at least one crystalline axis. As shown in FIG. 5, the gain medium 10 is pumped into an excited state via a source of energy 62, preferably a light source. The gain medium 10 preferably has a cross section of a parallelogram. As shown in FIG. 5, the optical components 64 of the optical amplifier 8 may comprise a resonant cavity or regenerative amplifier, preferably Model TRA 1000 from Clark-MXR of Dexter, Mich., a multipass amplifier, and/or a single pass amplifier, such as Model ADA-10, also from Clark-MXR of Dexter, Mich. Preferably, as is well known in the art, the arrangement of the optical components 64 are such that the regenerative amplifier may be arranged in series with the multipass amplifier which in turn is arranged in series with a single pass amplifier. Additionally, means such as a compressor 86, well known in the prior art, may be provided to recompress the pulse back to some predetermined pulse width of interest to the user; for example, back to the temporal pulse width that is limited by the spectral bandwidth of the output pulse.

Figure 4:
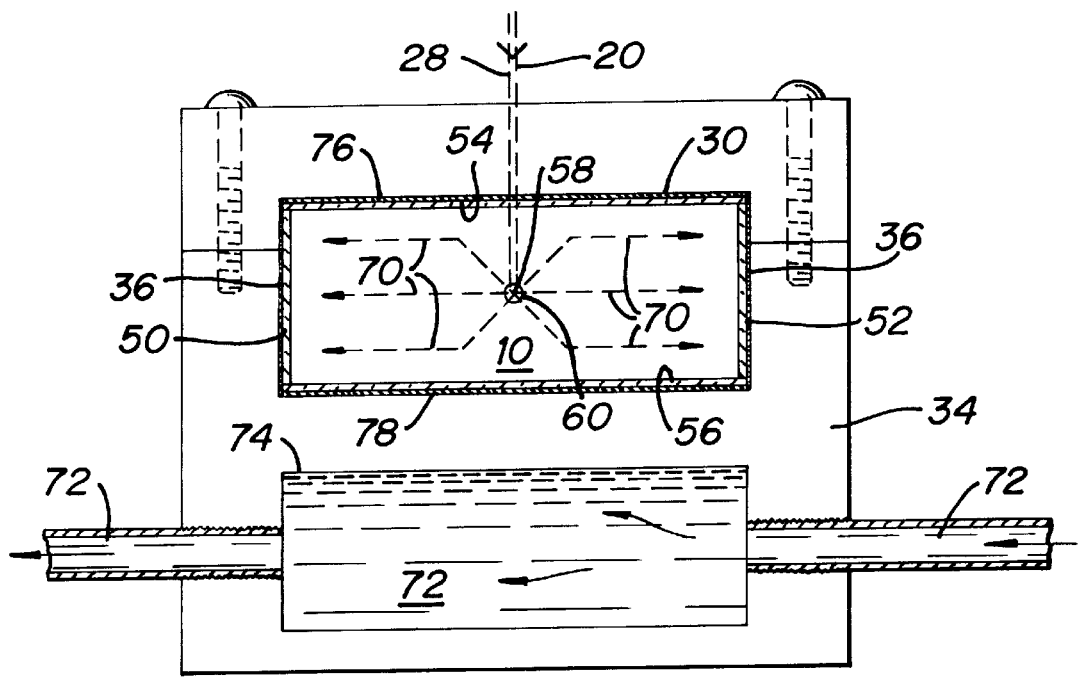
FIG. 4 is a cross-sectional view of the cooling arrangement of a rectangular-shaped gain media used in the present invention.

In FIG. 4 there is shown a cross section of the rectangularly-shaped gain medium 10 mounted in a specially designed heat sink 34. The optical axis 60 of the gain medium 10 in FIG. 3, which defines the center axis 58 of the gain medium 10 is now normal to the plane of the page in this FIG. 4, and is shown pointing down into the page, as the back of the arrow is denoted by an x within a circle, which is not illustrative of the heat flow through the gain medium 10. The heat load created by the absorption of the pump beam 20 as it propagates along the center axis 58 of the medium 10 is conducted outward along the direction of the dotted arrows 70 radiating outward from the center axis 58 to the first surface 50 and the second surface 52.

Substantially all of the first and second surfaces 50 and 52 of the gain medium 10 are arranged to be in thermal contact with a metallic heat sink 34 by using a thermally conducting paste or preferentially Indium foil 70 between the first and second surfaces 50, 52 of the gain medium 10 and a heat sink 34. Excess heat is carried away by cooling water 72 flowing through a cooling cavity 74 within the heat sink 34. Correspondingly, heat is prevented from dissipating through the surfaces 54 and 56 by placing a thermal insulating material 76 and 78, between the third and fourth surfaces 54 and 56 of the gain medium 10 and the heat sink 34. Thus, the temperature gradient will be larger along the horizontal axis, i.e. along the direction of the normal to the first and second surfaces 50 and 52, which in the case of Ti:Sapphire, is also the c-axis 24 of the gain medium 10, than along the vertical axis, i.e., along the direction of the normal to the surfaces 54 and 56.

The present invention minimizes the losses caused by thermally-induced birefringence because most of the heat flow is along a crystalline axis. In the present invention, the use of Ti:Sapphire crystal gain medium 10, the c-axis 24 of the crystal 10 will be the crystalline axis. Heat flow along a crystalline axis creates only a change in the index of refraction along that axis which, in itself, does not degrade the polarization. At the same time, the thermally-induced lens has significantly increased power along the direction of heat flow; i.e. along the direction of the normals to the first and second surfaces 50 and 52 than it has along the orthogonal direction corresponding to the normals to the third and fourth surfaces 54 and 56. When the path of the seed pulse beam 22 is folded in the plane in which the normals to the first and second surfaces 50 and 52 lie, it is possible to compensate for astigmatism in the shape of the resultant amplified seed pulse by adjusting the angle of reflection of the beam off of optical components in the path of the propagation of the beam.

Preferably, a method for operating the optical amplifier 8 for amplifying the ultra short seed pulses 28 comprises the steps of arranging selected optical components such that the ultra short laser seed pulse 28 is directed through the gain medium 10, pumping the gain media to an excited state with a source of energy, preferably a light source, 62 which is capable of amplifying seed pulses 28 whose bandwidths substantially coincides with that of the gain medium 10; directing a seed pulse 28 through the gain medium 10; and cooling the gain medium 10 preferentially along a crystalline axis to minimize losses created by thermally induced birefringence. In this invention, the geometrical shape and the cooling geometry of the gain medium 10 is arranged so that the pattern of heat flow through the gain medium 10 minimizes the creation of thermally induced spherical aberrations.

Preferably, the seed pulses 28 are directed through the gain medium 10 a plurality of times to increase the amount of the energy that can be extracted from the gain medium 10. The available pump energy may be distributed among multiple sections of the gain medium 10 to maximize the amount of pump energy that is converted into amplified seed pulse energy. Referring to FIG. 5, in a preferred embodiment, a pump laser 80 pumps the oscillator 82. In the preferred embodiment, standard means well known in the prior art, such as a stretcher 84, are provided to stretch the seed pulse from the oscillator 82, in time by multiplicative factors sufficient to ensure that upon amplification, the seed pulse power density remains below the self-focusing threshold of the material through which the pulse passes. The optical configuration of the amplified light beam used to direct the seed pulse through the gain medium is varied to minimize the adverse effects on the spatial structure of the amplified seed pulse caused by thermally induced distortions created in the gain medium From the foregoing description it will be apparent that there has been provided an improved configuration for cooling a gain medium designed to amplify ultrashort pulses that possesses the desirable characteristics of being able to minimize energy loss and a corresponding increase in prepulse, postpulse, and satellite pulse energy caused by thermally-induced birefringence distortions in the gain medium. An additional advantage of controlling the path of heat flow from the gain medium is that it is possible to shape the thermally induced optical distortions created in the gain medium in a manner that allows them to be largely compensated by other adjustments in the path of the seed pulse.

There has also been provided an improved method of operating an optical amplifier for amplifying ultrashort pulses comprising the steps of pumping a gain medium capable of amplifying seed pulses with a light source whose bandwidth substantially coincides with that of the gain medium; directing a seed pulse through the gain medium; and cooling the gain medium preferentially along a crystalline axis to minimize losses created by thermally-induced birefringence. In this method, the cooling geometry of the gain medium is arranged to minimize the creation of thermally induced spherical aberrations. The seed pulse may be passed multiple times through the gain medium to increase the amount of the energy extracted from it. The available pump energy may be distributed among multiple sections of gain medium to maximize the amount of pump energy that is converted into amplified seed pulse energy. The optical configuration used to direct the seed pulse through the gain medium may be varied to minimize the adverse effects on the spatial structure of the amplified pulse caused by the thermally-induced distortions created in the gain medium.

Variations and modifications in the invention described herein that are within the scope of the invention will undoubtedly suggest themselves to those skilled in the art. Accordingly, the foregoing description should be taken as illustrative and not in a limiting sense.

We claim:

1. An optical amplifier for amplifying an ultrashort laser seed pulse comprising:

optical components arranged to direct the ultrashort laser seed pulse through a gain medium;

a gain medium that is cooled by thermal conduction to a heat sink wherein the direction of heat flow is substantially along at least one crystalline axis; and a source of energy for excitation of the gain medium.

2. The optical amplifier of claim 1 wherein the gain medium has the cross section of a parallelogram.

3. The optical amplifier of claim 1 in which the optical components comprise a regenerative amplifier.

4. The optical amplifier of claim 1 in which the optical components comprise a multipass amplifier.

5. The optical amplifier of claim 1 in which the optical components and gain medium comprise a regenerative amplifier arranged in series with a multipass amplifier.

6. The optical amplifier of claim 1 in which the optical components and gain medium comprise a regenerative amplifier arranged in series with a multipass amplifier and a single pass amplifier.

7. The optical amplifier of claim 1 in which the gain medium is a solid that is doped with an element selected from a group consisting of titanium, chromium, aluminum or a rare-earth element.

8. The optical amplifier of claim 2 in which the optical components comprise a regenerative amplifier.

9. The optical amplifier of claim 2 in which the optical components comprise a multipass amplifier.

10. The optical amplifier of claim 2 in which the optical components and gain medium comprise a regenerative amplifier arranged in series with a multipass amplifier.

11. The optical amplifier of claim 2 in which the optical components and gain medium comprise a regenerative amplifier arranged in series with a multipass amplifier and a single pass amplifier.

12. The optical amplifier of claim 2 in which the gain medium is a solid that is doped with an element selected from a group consisting of titanium, chromium, aluminum or a rare-earth element.

13. The optical amplifier of claim 3 in which the gain medium is a solid that is doped with an element selected from a group consisting of titanium, chromium, aluminum or a rare-earth element.

14. The optical amplifier of claim 4 in which the gain medium is a solid that is doped with an element selected from a group consisting of titanium, chromium, aluminum or a rare-earth element.

15. The optical amplifier of claim 5 in which the gain medium is a solid that is doped with an element selected from a group consisting of titanium, chromium, aluminum or a rare-earth element.

16. The optical amplifier of claim 6 in which the gain medium is a solid that is doped with an element selected from a group consisting of titanium, chromium, aluminum or a rare-earth element.

17. A method of operating an optical amplifier for amplifying ultrashort pulses comprising the steps of:

pumping a gain medium with a source of energy capable of amplifying seed pulses whose bandwidth substantially coincides with that of the gain medium;

directing a seed pulse through the gain medium; and cooling the gain medium preferentially along a crystalline axis to minimize losses created by thermally-induced birefringence.

18. The method of claim 17 further comprising the step of arranging the geometrical shape of the gain medium to minimize the creation of thermally induced spherical aberrations.

19. The method of claim 17 further comprising the step of arranging the cooling geometry of the gain medium so that the pattern of heat flow minimizes the creation of thermally-induced spherical aberrations.

20. The method of claim 17 further comprising the step of passing the seed pulse multiple times through the gain medium to increase the amount of the energy extracted from the gain medium.

21. The method of claim 17 further comprising the step of distributing the available pump energy among multiple sections of gain medium to maximize the amount of pump energy that is converted into amplified seed pulse energy.

22. The method of claim 17 further comprising the step of varying the optical configuration used to direct the seed pulse through the gain medium to minimize the adverse effects on the spatial structure of the amplified pulse caused by the thermally-induced distortions created in the gain medium.

23. The method of claim 18 further comprising the step of arranging the cooling geometry of the gain medium so that the pattern of heat flow minimizes the creation of thermally-induced spherical aberrations.

24. The method of claim 18 further comprising the step of passing the seed pulse multiple times through the gain medium to increase the amount of the energy extracted from the gain medium.

25. The method of claim 18 further comprising the step of distributing the available pump energy among multiple sections of gain medium to maximize the amount of pump energy that is converted into amplified seed pulse energy.

26. The method of claim 18 further comprising the step of varying the optical configuration used to direct the seed pulse through the gain medium to minimize the adverse effects on the spatial structure of the amplified pulse caused by the thermally-induced distortions created in the gain medium.

27. The method of claim 19 further comprising the step of passing the seed pulse multiple times through the gain medium to increase the amount of the energy extracted from the gain medium.

28. The method of claim 19 further comprising the step of distributing the available pump energy among multiple sections of gain medium to maximize the amount of pump energy that is converted into amplified seed pulse energy.

29. The method of claim 19 further comprising the step of varying the optical configuration used to direct the seed pulse through the gain medium to minimize the adverse effects on the spatial structure of the amplified pulse caused by the thermally-induced distortions created in the gain medium.

30. The method of claim 20 further comprising the step of distributing the available pump energy among multiple sections of gain medium to maximize the amount of pump energy that is converted into amplified seed pulse energy.

31. The method of claim 20 further comprising the step of varying the optical configuration used to direct the seed pulse through the gain medium to minimize the adverse effects on the spatial structure of the amplified pulse caused by the thermally-induced distortions created in the gain medium.

32. The method of claim 21 further comprising the step of varying the optical configuration used to direct the seed pulse through the gain medium to minimize the adverse effects on the spatial structure of the amplified pulse caused by the thermally-induced distortions created in the gain medium.

33. A method of operating an optical amplifier for amplifying ultrashort pulses comprising the steps of:

pumping a gain medium with a source of energy capable of amplifying seed pulses whose bandwidth substantially coincides with that of the gain medium;

directing a seed pulse through the gain medium; and cooling the gain medium substantially along a crystalline axis to minimize the creation of thermally-induced spherical aberrations.

34. The method of claim 33 further comprising the step of arranging the cooling geometry of the gain medium so that the pattern of heat flow minimizes the creation of thermally-induced spherical aberrations.

35. The method of claim 33 further comprising the step of passing the seed pulse multiple times through the gain medium to increase the amount of the energy extracted from the gain medium.

36. The method of claim 33 further comprising the step of distributing the available pump energy among multiple sections of gain medium to maximize the amount of pump energy that is converted into amplified seed pulse energy.

37. The method of claim 33 further comprising the step of varying the optical configuration used to direct the seed pulse through the gain medium to minimize the adverse effects on the spatial structure of the amplified pulse caused by the thermally-induced distortions created in the gain medium.

38. The method of claim 34 further comprising the step of passing the seed pulse multiple times through the gain medium to increase the amount of the energy extracted from the gain medium.

39. The method of claim 34 further comprising the step of distributing the available pump energy among multiple sections of gain medium to maximize the amount of pump energy that is converted into amplified seed pulse energy.

40. The method of claim 34 further comprising the step of varying the optical configuration used to direct the seed pulse through the gain medium to minimize the adverse effects on the spatial structure of the amplified pulse caused by the thermally-induced distortions created in the gain medium.

41. The method of claim 35 further comprising the step of distributing the available pump energy among multiple sections of gain medium to maximize the amount of pump energy that is converted into amplified seed pulse energy.

42. The method of claim 35 further comprising the step of varying the optical configuration used to direct the seed pulse through the gain medium to minimize the adverse effects on the spatial structure of the amplified pulse caused by the thermally-induced distortions created in the gain medium.

43. The method of claim 36 further comprising the step of varying the optical configuration used to direct the seed pulse through the gain medium to minimize the adverse effects on the spatial structure of the amplified pulse caused by the thermally-induced distortions created in the gain medium.

44. A method of operating an optical amplifier for amplifying ultrashort pulses comprising the steps of:

pumping a gain medium with a source of energy capable of amplifying seed pulses whose bandwidth substantially coincides with that of the gain medium;

directing a seed pulse through the gain medium; and arranging the cooling geometry of the gain medium such that the thermal gradients formed by the absorption of the pump light in the gain medium create a substantially cylindrical lens.

45. The method of claim 44 further comprising the step of passing the seed pulse multiple times through the gain medium to increase the amount of the energy extracted from the gain medium.

46. The method of claim 44 further comprising the step of distributing the available pump energy among multiple sections of gain medium to maximize the amount of pump energy that is converted into amplified seed pulse energy.

47. The method of claim 44 further comprising the step of varying the optical configuration used to direct the seed pulse through the gain medium to minimize the adverse effects on the spatial structure of the amplified pulse caused by the thermally-induced distortions created in the gain medium.

48. The method of claim 45 further comprising the step of distributing the available pump energy among multiple sections of gain medium to maximize the amount of pump energy that is converted into amplified seed pulse energy.

49. The method of claim 45 further comprising the step of varying the optical configuration used to direct the seed pulse through the gain medium to minimize the adverse effects on the spatial structure of the amplified pulse caused by the thermally-induced distortions created in the gain medium.

50. The method of claim 46 further comprising the step of varying the optical configuration used to direct the seed pulse through the gain medium to minimize the adverse effects on the spatial structure of the amplified pulse caused by the thermally-induced distortions created in the gain medium.

* * * * *